United States Patent [19]

Matsumoto

[11] Patent Number: 5,507,587
[45] Date of Patent: Apr. 16, 1996

[54] CLAMP DEVICE FOR ROTARY SHAFT PORTION

[75] Inventor: Masakazu Matsumoto, Higashi-Osaka, Japan

[73] Assignee: Nikken Kosakusho Works, Ltd., Higashi-Osaka, Japan

[21] Appl. No.: 327,852

[22] Filed: Oct. 21, 1994

Related U.S. Application Data

[62] Division of Ser. No. 946,436, Nov. 18, 1992, Pat. No. 5,385,424.

[30] Foreign Application Priority Data

Apr. 26, 1991 [JP] Japan .................................. 3-29731

[51] Int. Cl.⁶ .................................................. F16D 49/00
[52] U.S. Cl. ..................... 403/369; 403/373; 403/350; 403/367; 192/41 R; 192/110 R
[58] Field of Search ..................... 403/369, 368, 403/367, 374, 373, 350; 192/41 R, 45, 110 B; 384/571; 188/82.84

[56] References Cited

U.S. PATENT DOCUMENTS

| | | | |
|---|---|---|---|
| 1,834,843 | 12/1931 | Humfrey | 192/45 |
| 1,895,678 | 1/1933 | Pitter | 192/41 R |
| 2,068,198 | 1/1937 | Seifarth | 384/571 |
| 4,278,156 | 7/1981 | Yano . | |
| 4,462,490 | 7/1984 | Hattori | 192/45 X |
| 4,573,561 | 3/1986 | Deem et al. | 192/110 B X |
| 4,593,799 | 6/1986 | Ozaki . | |
| 5,109,964 | 5/1992 | Fukui et al. | 192/45 |
| 5,381,879 | 1/1995 | Takata | 192/45 |
| 5,385,424 | 1/1995 | Matsumoto | 192/110 B X |

FOREIGN PATENT DOCUMENTS

| | | |
|---|---|---|
| 385224 | 3/1988 | Austria . |
| 263232 | 4/1988 | European Pat. Off. . |
| 2440491 | 5/1980 | France . |
| 910018 | 4/1954 | Germany . |
| 2943142 | 5/1980 | Germany . |
| 3041650 | 5/1981 | Germany . |
| 3408371 | 9/1984 | Germany . |
| 3600994 | 11/1986 | Germany . |
| 37-2711 | 2/1962 | Japan . |
| 55-60727 | 5/1980 | Japan . |
| 59-164423 | 9/1984 | Japan . |
| 1-58774 | 12/1989 | Japan . |
| 2034832 | 6/1980 | United Kingdom . |
| 2139714 | 11/1984 | United Kingdom . |
| WO91/04814 | 4/1991 | WIPO . |

*Primary Examiner*—Anthony Knight
*Attorney, Agent, or Firm*—Oblon, Spivak, McClelland, Maier & Neustadt

[57] ABSTRACT

A clamp device is provided which is operable with extreme ease for clamping and unclamping a rotary shaft portion under remote control and which is capable of exerting a great clamping force and unlikely to displace the shaft axis. The clamp device includes a fixed sleeve (10) radially elastically deformable, rotatably supporting the shaft portion (7) and having a tapered surface (12) over a periphery thereof on the opposite side of a shaft supporting portion (11) thereof, a rotatable clamp member (17) having a tapered surface fitting to the sleeve tapered surface (12) with rollers (15) provided therebetween, the rollers being arranged as inclined with respect to the axis of the sleeve, and a drive unit (23) for rotating the clamp member.

11 Claims, 5 Drawing Sheets

CLAMP DEVICE FOR ROTARY SHAFT PORTION

This is a Division of application Ser. No. 07/946,436 filed on Nov. 18, 1992 now U.S. Pat. No. 5,385,424.

TECHNICAL FIELD

The present invention relates to a clamp device for rotary shaft portions.

BACKGROUND ART

The present invention relates to a device for clamping rotary shaft portions.

Hand brake devices, disk brake devices and like brake devices and clutch devices are well known as devices for clamping rotary shaft portions. Also known are clamp devices wherein a tapered sleeve is used for holding a shaft portion to a fixed portion (see, for example, Examined Japanese Utility Model Publication SHO 37-2711).

Such a clamp device is included in a tilting rotary table apparatus as shown in FIG. 6.

The tilting rotary table apparatus is attached to a machine tool for use in machining workpieces. The apparatus has a circular table rotating shaft 60 and a circular table tilting shaft 61. A circular table 62 is rotatable about the shaft 60 by a table rotating drive assembly 65 comprising a servomotor 63 for the rotating shaft, a worm 64, etc. The circular table 62 is further rotatable about the tilting shaft 61 by a table tilting drive assembly 70 comprising a servomotor 67 for the tilting shaft, a worm 68, a worm gear 69, etc.

The tilting shaft 61 or the rotating shaft 60 of the tilting rotary table apparatus is held against rotation conventionally by pressing a hydraulic pressure pad 73 against a brake plate 72 provided at one end of the tilting shaft 61 or by pressing a hydraulic pressure pad 74 against the periphery of the circular table 62.

When a great cutting force acts on the tilting shaft 61 of the table apparatus, exceeding the clamping force of the clamp device, the cutting force acts directly on the portions of the worm 68 and the worm gear 69 meshing with each other and is likely to damage the toothed face of the worm.

With the conventional clamp device, therefore, an increased hydraulic pressure is applied to provide a greater clamping force. However, the increased pressure, when applied to the hydraulic pressure pad 73, will cause marked wear on the tilting shaft brake plate 72 and a fixed portion 75 to shift the tilting shaft 61 axially thereof and displace the axis of the rotating shaft 60 of the circular table 62. Further if a great force is applied to press the pad 74 against the circular table, the rotating shaft 60 is likely to be warped by the force.

On the other hand, the clamp device wherein a tapered sleeve is used, exterts a great fastening force and acts radially of the sleeve, and is accordingly less likely to cause damage to the toothed face of the worm and to displace the shaft axis. Nevertheless, the shaft portion of the tilting rotary table apparatus is frequently clamped and unclamped by remote control, so that extreme difficulties are encountered in using the tapered sleeve for the clamp device.

DISCLOSURE OF THE INVENTION

An object of the present invention is to provide a clamp device which is operable with extreme ease for clamping and unclamping a rotary shaft portion under remote control and which is capable of exerting a great clamping force and is unlikely to displace the shaft axis.

To fulfill the above object, the present invention provides the following means. More specifically, the present invention is characterized by a fixed sleeve radially elastically deformable, rotatably supporting a shaft portion and having a tapered surface over a periphery thereof on the opposite side of a shaft supporting portion thereof, a rotatable clamp member having a tapered surface fitting to the tapered surface of the fixed sleeve with rollers provided therebetween, the rollers being arranged as being inclined with respect to the axis of the sleeve, and a drive unit for rotating the clamp member.

According to the present invention, the rotatable clamp member is rotated in one direction by the drive unit. The rollers arranged on the tapered surface of the sleeve and inclined with respect to the axis thereof are each rotated about their own axis by the rotation of the clamp member to roll on the tapered surface in an oblique direction. Consequently, a screw action produced by the rolling rollers axially moves the clamp member while rotating the member, fastening the clamp member to the tapered surface of the fixed sleeve with increased pressure or, conversely, loosening the clamp member.

Accordingly, when the clamp member is rotated in the direction in which the member is fitted to the tapered surface of the fixed sleeve with the increased pressure, the sleeve is contracted or expanded radially thereof toward the shaft supporting portion and tightly fastened to the shaft portion to prevent rotation of the shaft portion (i.e., a clamped state).

When the shaft portion is thus clamped, the fixed sleeve is fastened by the shaft portion radially thereof and is therefore unlikely to move axially. The fastening force of the fixed sleeve increases relative to the torque as the taper angle decreases, hence a great fastening force is available.

When rotated in a direction opposite to the above by the drive unit, the clamp member is loosened from the tapered surface of the fixed sleeve, relieving the shaft portion of the fastening force of the fixed sleeve to render the shaft portion free to rotate (i.e., an unclamped state).

When the device has preloading means for biasing the rotatable clamp member in a direction to fit the member to the sleeve tapered surface under increased pressure, the preloading means precludes the clamp member from backlashing when the member is not clamping, and also prevents deflection of the axis of the clamp member when the member is tightened up.

As described above, the shaft portion can be clamped and unclamped very easily, this operation can be effected under remote control, and the shaft portion can be clamped with a great force without permitting displacement of the axis. Thus, the present invention has outstanding advantages.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

BEST MODE OF CARRYING OUT THE INVENTION

Embodiments of the invention will be described below with reference to the drawings.

Figure 1:
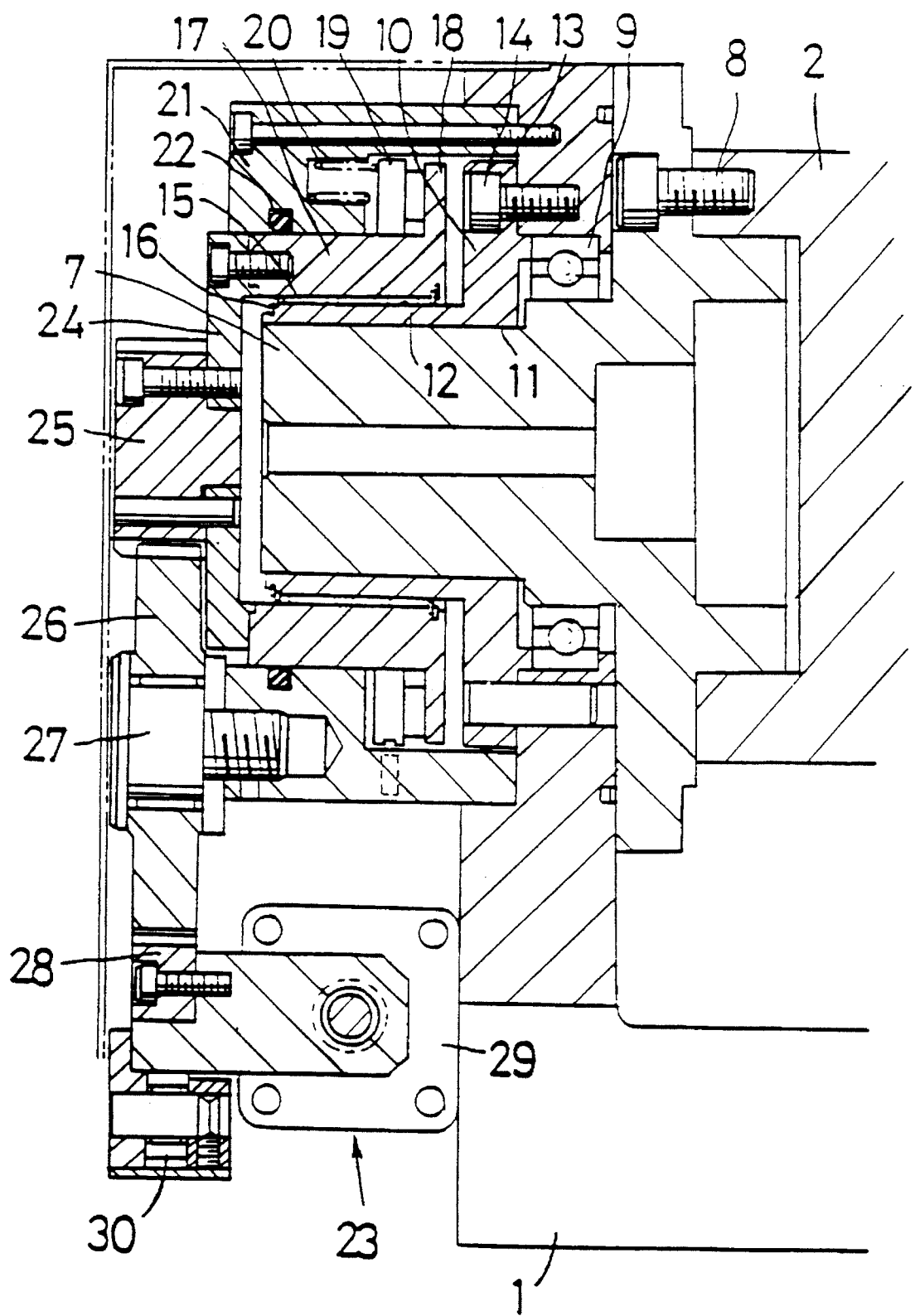
FIG. 1 is a fragmentary view in section showing a first embodiment of the invention.
Figure 4:
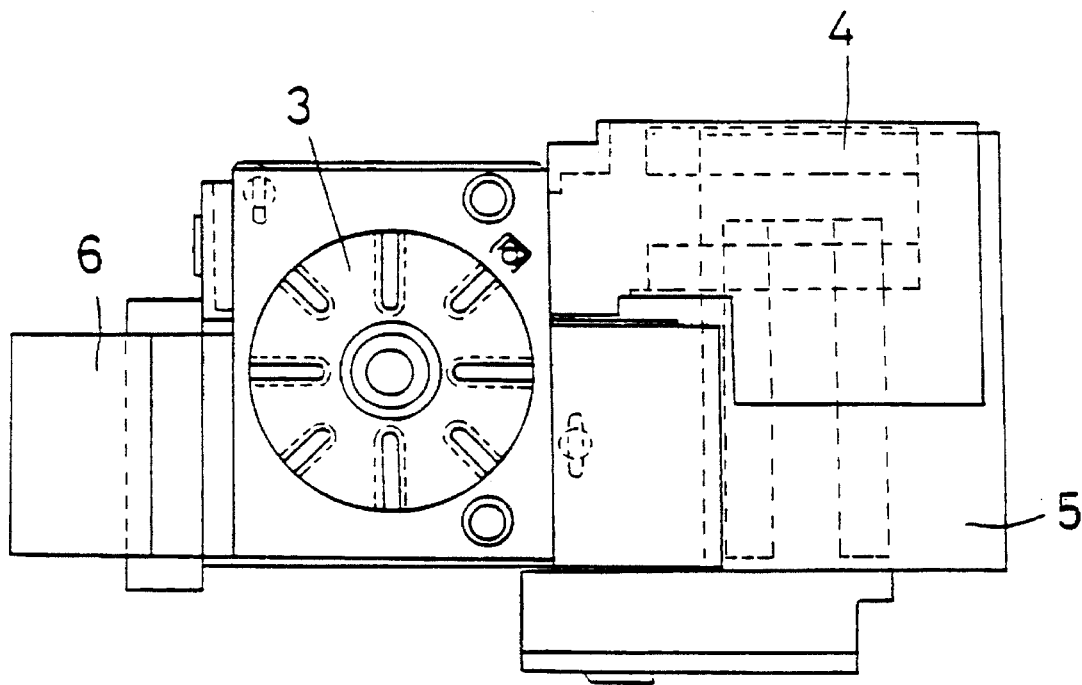
FIG. 4 is a plan view of a tilting rotary table apparatus.
Figure 5:
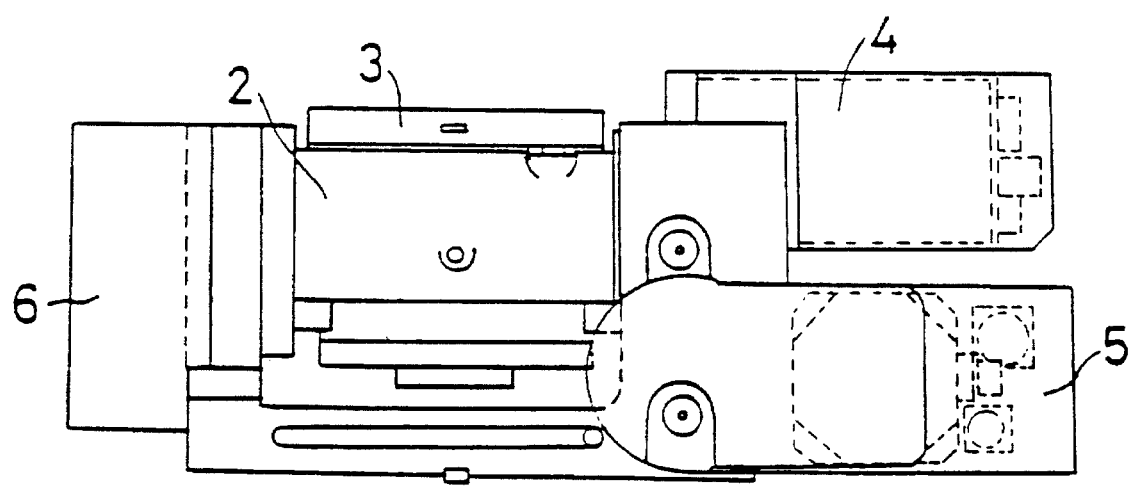
FIG. 5 is a front view of the tilting rotary table apparatus.
Figure 6:
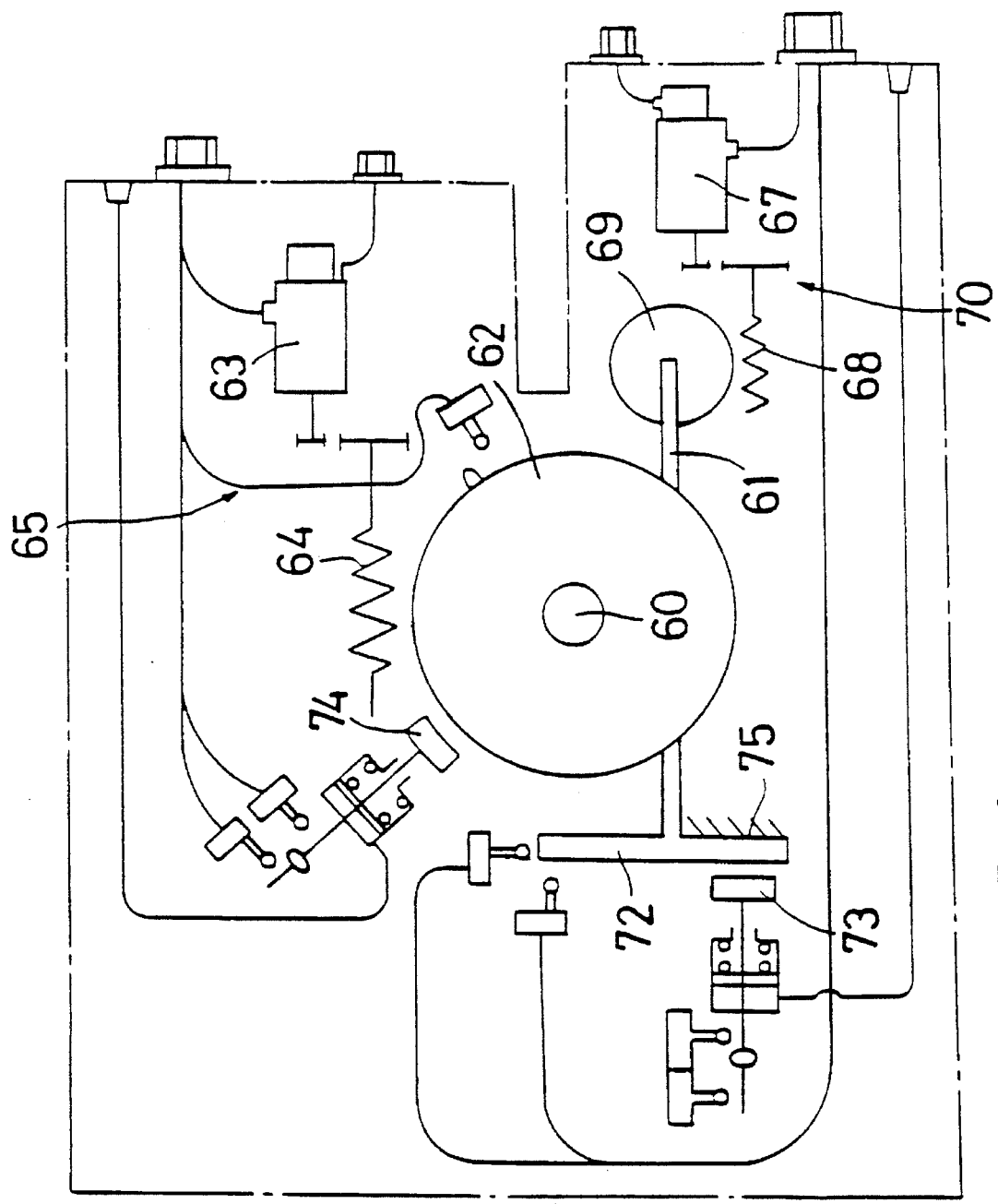
FIG. 6 is a diagram showing conventional locking devices.

FIGS. 1, 4 and 5 show the appearance of a tilting rotary table apparatus. The apparatus comprises a base 1, a tilting frame 2 mounted on the base 1 and rotatable about a horizontal axis, and a circular table 3 mounted on the tilting table 2 and rotatable about a vertical axis. The tilting frame 2 is provided with a rotating drive unit 4 for rotating the circular table 3 about the vertical axis. Mounted on the base 1 are a tilting drive unit 5 for rotating the tilting frame 2 about the horizontal axis, and a clamp device 6 for preventing rotation of the tilting frame 2.

FIG. 1 shows the clamp device 6 in detail. With reference to this drawing, a shaft portion 7 is fixed to one end of the tilting frame 2 with bolts 8 and rotatably supported by a bearing 9 on the base 1. The axis of the shaft portion 7 is the above-mentioned horizontal axis, and the tilting frame 2 is rotatable about the axis of the shaft portion 7.

The shaft portion 7 further projects outward from the bearing 9. The projecting part is rotatably supported by a sleeve 10 fixed to the base 1.

The outer periphery of the projecting part of the shaft portion 7 is in the form of a straight cylindrical surface. The inner periphery of the fixed sleeve 10 is also in the form of a straight cylindrical surface and serves as a shaft supporting portion 11. The two surfaces are rotatable in sliding contact with each other.

The radially outer periphery of the fixed sleeve 10 is in the form of a tapered surface 12 having a decreasing diameter toward its outer end. The fixed sleeve 10 is formed at its base end with a flange portion 13 extending radially outward. The flange portion 13 is fixed to the base 1 with bolts 14.

The fixed sleeve 10 is made of metal and is therefore elastically deformable so as to radially contract when subjected to a compressive force radially thereof. To ensure facilitated radial elastic deformation, the projecting portion of the fixed sleeve 10 is preferably formed on its inner periphery with recesses extending axially thereof. Preferably, a plurality of recesses are formed as arranged at a predetermined spacing circumferentially of the sleeve. Provision of the recesses makes it possible to give an increased wall thickness and enhanced rigidity to the fixed sleeve 10. The recesses need not be parallel to the axis but may be inclined or helical. Furthermore, the recesses may extend to the outer periphery in the form of slits.

A multiplicity of rows of substantially cylindrical needle rollers 15 are arranged on the outer peripheral tapered surface 12 of the projecting portion of the fixed sleeve 10. The needle rollers are arranged as being inclined with respect to the axis of the fixed sleeve 10, and are held oriented in a specified direction by a retainer 16.

A rotatable clamp member 17 is fitted over the tapered surface 12 of the fixed sleeve 10 with the needle rollers 15 provided therebetween. The clamp member 17 is tubular and is formed on its inner periphery with a tapered surface having the same taper angle as the tapered surface 12 of the fixed sleeve 10 and in contact with the needle rollers 15. The outer periphery of the rotatable clamp member 17 is in the form of a straight cylindrical surface.

The clamp member 17 has a flange portion 18 extending radially outward from its base end (toward the tilting frame 2). A thrust bearing 19 is in contact with the outer face of the flange portion 18 (opposite to the other face thereof closer to the tilting frame 2). Preloading means 20 is in contact with the outer end face of the bearing 19. The preloading means 20 comprises a coiled compression spring. The outer end of the preloading means 20 comprising the compression spring bears on a tubular cover 21 secured to the base 1. The inner periphery of the cover 21 supports the outer periphery of the clamp member 17 rotatably and axially movably to hold the clamp member 17 coaxial with the fixed sleeve 10. An O-ring 22 is interposed between the inner periphery of the cover 21 and the outer periphery of the clamp member 17 for preventing the clamp member 17 from backlashing.

The clamp member 17 is rotatable by a drive assembly 23, which has the following construction.

A disk 24 is fixed to the outer end face of the clamp member 17 and has a drive gear 25 fixed thereto. The drive gear 25 is in alignment with the clamp member 17. The drive gear 25 is in mesh with an idler gear 26 which is rotatably supported by a shaft 27 secured to the outer end face of the cover 21. The idler gear 26 is in mesh with a rack gear 28, which is reciprocatingly movable by a direct-acting hydraulic cylinder 29. The back face of the gear 28 is supported by a roller 30.

With the clamp device 6 thus constructed for the shaft portion 7, the hydraulic cylinder 29 of the drive assembly 23 is operated under remote control to move the rack gear 28 in one direction. This movement causes the idler gear 26 to rotate the drive gear 25, which rotates the clamp member 17. The clamp member 17 rotates the needle rollers 15 in an inclined arrangement. The needle rollers 15 roll on the tapered surface 12 circumferentially thereof and also move axially thereof. Thus, the rollers 15 move helically like a screw. Consequently, the clamp member 17 moves also helically to fit to the sleeve tapered surface with an increased pressure or, conversely, loosen.

When the clamp member 17 loosely fits to the tapered surface, the fixed sleeve 10 is subjected to no radial compressive force, consequently rendering the shaft portion 7 free to rotate relative to the fixed sleeve 10. The shaft portion is then in an unclamped state, in which the tilting frame 2 is free to rotate about the axis of the shaft portion 7 and is rotatable through a desired angle. When in this unclamping state, the clamp member 17 is biased by the preloading means in a direction in which the member fits to the tapered surface under a greater pressure, whereas the biasing force is unable to radially contract the fixed sleeve 10.

When the clamp member 17 in the unclamping state is rotated by the drive assembly 23 and thereby helically advanced toward the direction of a tighter fit, the clamp member 17 causes the needle rollers 15 to compress the fixed sleeve 10 radially inward. The compressive force radially contracting the fixed sleeve 10 clamps the shaft portion 7 to prevent the rotation of the shaft portion 7.

When thus clamping, the fixed sleeve 10 radially contracts the shaft portion 7 and therefore will not displace the axis of the shaft portion 7 even if this portion is worn. Since the shaft portion 7 is prevented from moving also axially thereof, the axis of the circular table 3 will not be displaced either.

Figure 2:
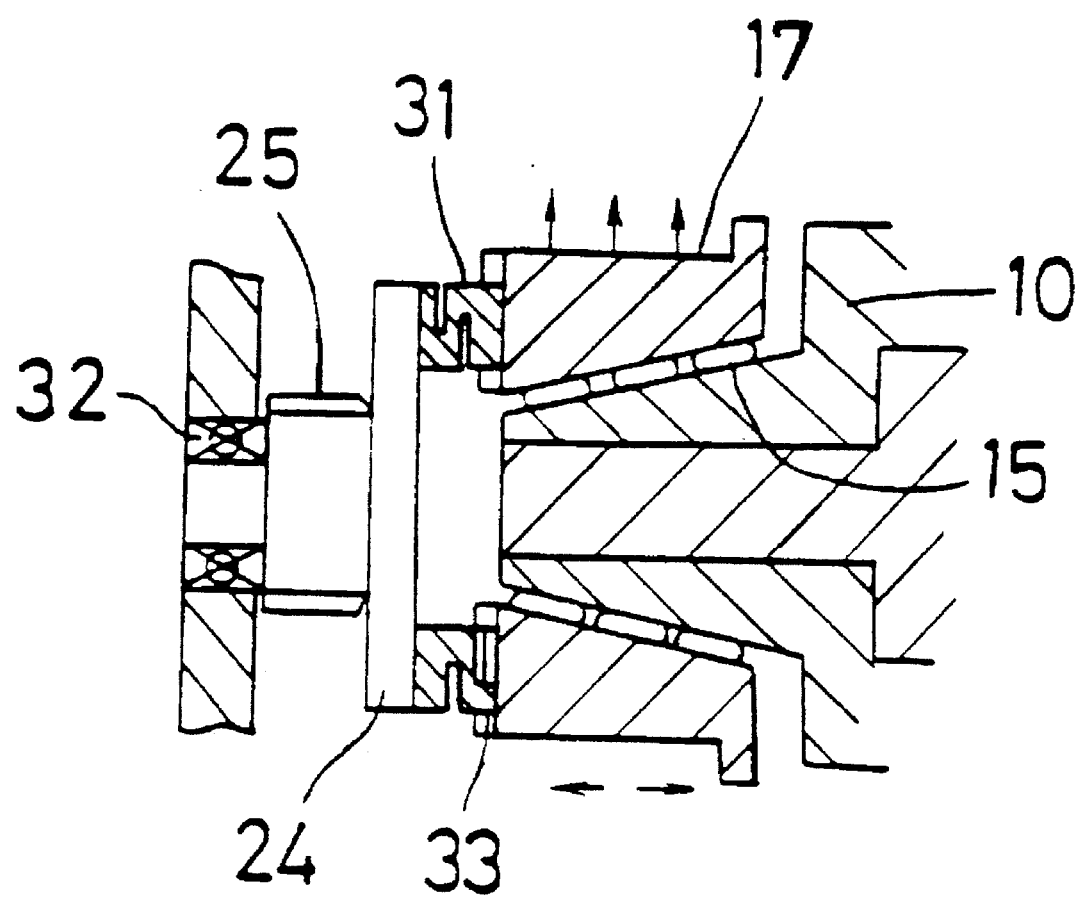
FIG. 2 is a fragmentary view in section showing a second embodiment of the invention.

FIG. 2 shows another embodiment of the invention, which differs from the foregoing embodiment in that the rotatable clamp member 17 is connected to the disk 24 of the drive assembly 23 by a universal joint 31, and that the drive gear 25 is supported by a bearing 32.

More specifically, the clamp member 17 is connected to the drive gear 25 by the universal joint 31 which is deformable radially and axially so as to prevent deflection of the axis of the clamp member 17 under the influence of the drive gear 25 when the clamp member 17 is tightened up. Accordingly, the drive gear 25 of this embodiment is axially immovable.

Although the universal joint 31 is secured to the clamp member 17 and to the disk 24, the member and the disk can be disengageably connected together.

In this case, the clamp member 17 is formed in its outer end face with radial recesses 33, in which projections provided on the disk 24 are slidably engaged. The recesses 33 are formed to permit radial expansion or deformation of the clamp member 17. When tightened up, the clamp member 17 radially expands, and this expansion is absorbed by the recesses 33. The recesses 33 have a depth not permitting disengagement of the projections even if the clamp member 17 moves axially. The recesses 33 may alternatively be formed in the disk 24.

Figure 3:
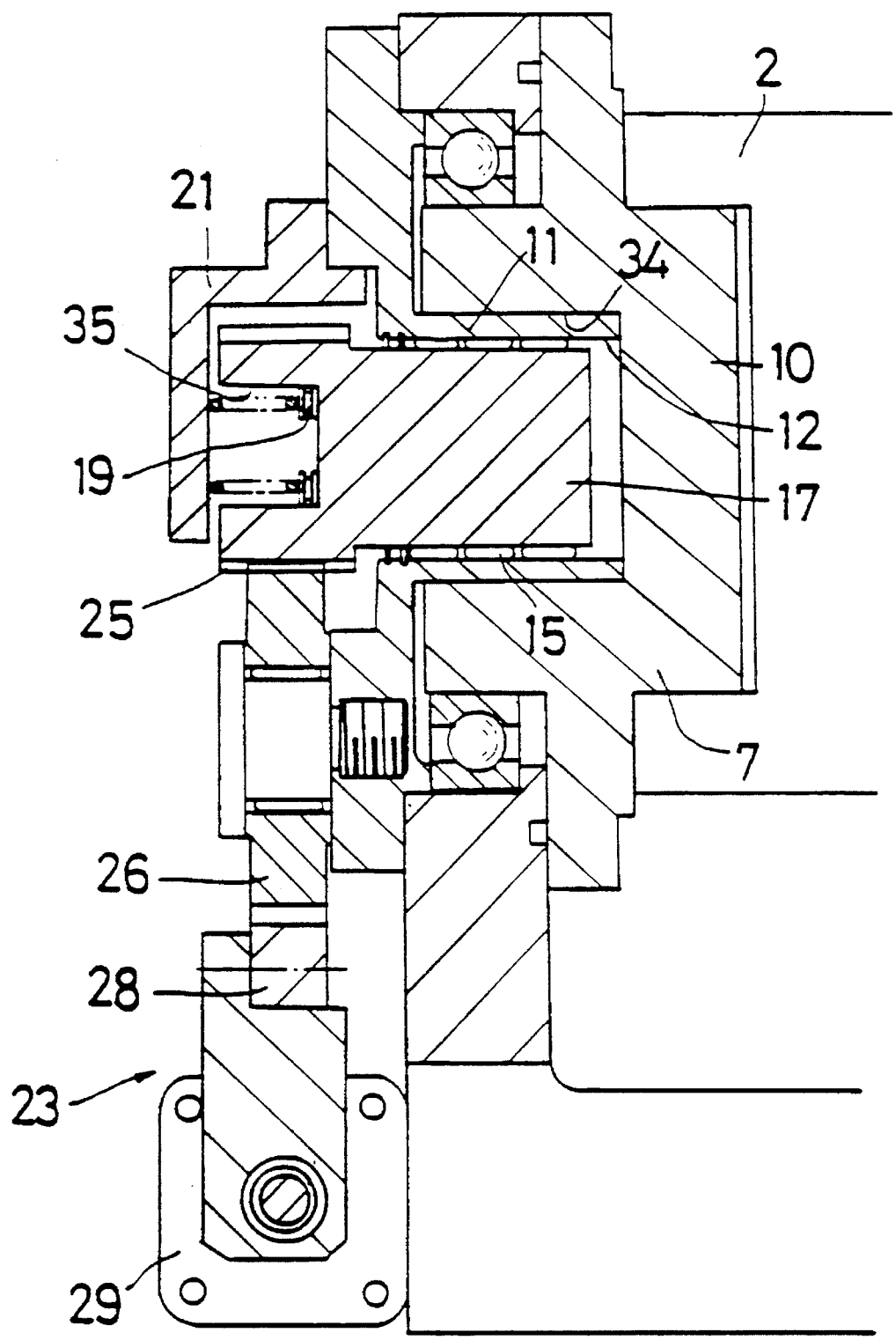
FIG. 3 is a fragmentary view in section showing a third embodiment of the invention.

FIG. 3 shows another embodiment of the invention.

With this embodiment, a shaft portion 7 is formed in its center with a cavity 34 having an opening in the outer end face of the portion 7. The inner periphery of the cavity 34 is in the form of a straight cylindrical surface.

A fixed sleeve 10 is fitted in the cavity 34. The outer periphery of the fixed sleeve 10 is in the form of a straight cylindrical surface and provides a shaft support portion 11 rotatably supporting the shaft portion 7. The inner periphery of the fixed sleeve 10 is in the form of a tapered surface 12 having a decreasing diameter toward a tilting frame 2. A rotatable clamp member 17 is fitted to the tapered surface 12 with needle rollers 15 interposed therebetween. These rollers are arranged as inclined in the same manner as in the foregoing embodiments.

The clamp member 17 is formed in the center of its outer end face with a recessed portion 35, and a thrust bearing 19 is provided in the bottom of the recessed portion 35. The bearing 19 is pressed against the bottom wall by preloading means 20 comprising a coiled compression spring.

A drive gear 25 is formed on the outer periphery of the outer end of the clamp member 17. The drive gear 25 is in mesh with an idler gear 26 as is the case with the foregoing embodiments.

With the embodiment of FIG. 3, the clamp member 17, when rotated by a drive assembly 23, causes the needle rollers 15 to act as a screw, whereby the clamp member 17 is forced into the sleeve and fitted to the tapered surface 12 with an increased pressure. This radially outwardly presses and radially expands the fixed sleeve 10, which is in turn pressed against the inner periphery of the shaft portion 7 defining its cavity 34 to clamp the shaft portion 7.

The clamp device of the present invention is not limited to the foregoing embodiments but is usable also for the rotating shaft of the circular table. The device is applicable also to apparatus other than tilting rotary table apparatus. The drive assembly for rotating the clamp member is not limited to the one including a hydraulic cylinder.

INDUSTRIAL APPLICABILITY

As described above, the present invention can be embodied as a clamp device for the rotary shaft of of the rotary table apparatus to be attached to a machine tool or the like.

I claim:

1. A clamp device for a rotary shaft portion comprising:

a sleeve fixed to a main body, said sleeve being radially elastically deformable and having an outer periphery rotatably supporting a shaft portion and an inner periphery in the form of a tapered surface of an opposite side of a shaft supporting portion thereof;

a plurality of rollers arranged on the tapered surface of the fixed sleeve and inclined with respect to the axis of the sleeve;

a rotatable clamp member having a tapered surface of substantially the same taper angle as the tapered surface of the fixed sleeve and rotatably fitted to the tapered sleeve of the fixed sleeve with the rollers provided therebetween, the rotatable clamp member being axially movable;

a drive unit rotating said rotatable clamp member;

a shaft and a plurality of bearings supporting said shaft on said main body wherein said shaft has a part which projects axially outward from the bearing and said part of said shaft is rotatably supported by said fixed sleeve.

2. A clamp device for a rotary shaft portion comprising:

a sleeve fixed to a main body, said sleeve being radially elastically deformable and having an outer periphery rotatably supporting the shaft portion and an inner periphery in the form of a tapered surface on an opposite side of a shaft supporting portion thereof;

a plurality of rollers arranged on the tapered surface of the fixed sleeve and inclined with respect to the axis of the sleeve;

a rotatable clamp member having a tapered surface of substantially the same taper angle as the tapered surface of the fixed sleeve and rotatably fitted to the tapered surface of the fixed sleeve with rollers provided therebetween, the rotatable clamp member being axially movable; and a drive unit rotating said rotatable clamp member wherein said fixed sleeve is in rotatable sliding contact with said shaft when said clamp member is not rotated by said drive unit.

3. A clamp device for a rotary shaft portion comprising:

a sleeve fixed to a main body, said sleeve being radially elastically deformable and having an outer periphery rotatably supporting a shaft portion and an inner periphery in the form of a tapered surface on an opposite side of a shaft supporting portion thereof;

a plurality of rollers arranged on the tapered surface of the fixed sleeve and inclined with respect to the axis of the sleeve so as to move helically and axially with respect to said tapered surface upon being rotated;

a rotatable clamp member having a tapered surface of substantially the same taper angle as the tapered surface of the fixed sleeve and rotatably fitted to the tapered surface of the fixed sleeve with the rollers provided therebetween, the rotatable clamp member being axially movable;

a drive unit for rotating said rotatable clamp member; and an axially movable gear by which the clamp member is operatively connected to said drive unit.

4. A clamp device for a rotary shaft portion as defined in claim 3 which further comprises preloading means for biasing the rotatable clamp member in a direction in which the clamp member fits the tapered surface of said fixed sleeve with an increased force.

5. A clamp device for a rotary shaft portion as defined in claim 4, wherein the preloading means comprises a compression spring.

6. A clamp device for a rotary shaft portion as defined in claim 5, wherein the compression spring bears against the rotatable clamp member with a thrust bearing provided therebetween.

7. A clamp device for a rotary shaft portion as defined in claim 3 wherein the rollers are needle rollers.

8. A clamp device for a rotary shaft portion as defined in claim 3, which comprises a joint which interengages said gear and said clamp member.

9. A clamp member for a rotary shaft portion as defined in claim 3, which comprises a preloading member biasing the rotatable clamp member in a direction in which the clamp member fits the tapered surface of said fixed sleeve with an increasing force.

10. A clamp device for a rotating shaft portion as defined in claim 9, wherein the preloading member comprises a compression spring.

11. A clamp device for a rotary shaft portion comprising:

a sleeve fixed to a main body, said sleeve being radially elastically deformable and having an outer periphery rotatably supporting a shaft portion and an inner perphiery in the form of a tapered surface on an opposite side of a shaft supporting portion thereof;

a plurality of rollers arranged on the tapered surface of the fixed sleeve and inclined with the respect to the axis of the sleeve;

a rotatable clamp member having a tapered surface of substantially the same taper angle as the tapered surface of the fixed sleeve and rotatably fitted to the tapered surface of the fixed sleeve with the rollers provided therebetween, the clamp member being axially movable;

a drive unit for rotating said rotatable clamp member; and a gear mechanism by which said rotatable clamp member is operatively connected to said drive unit, wherein a gear of said gear mechanism is connected to said rotatable clamp member by joint which is deformable radially and axially.

* * * * *

UNITED STATES PATENT AND TRADEMARK OFFICE
CERTIFICATE OF CORRECTION

PATENT NO. : 5,507,587
DATED : April 16, 1996
INVENTOR(S) : Masakazu MATSUMOTO

It is certified that error appears in the above-indentified patent and that said Letters Patent is hereby corrected as shown below:

On the title page, Item [62], and in Column 1, lines 4-5, the Related U.S. Application Data is written incorrectly. In both places it should read:

--[62] Related U.S. Application Data

Division of Ser. No. 946,436, Nov. 18, 1992, Pat. No. 5,385,424, which was filed as International Application No. PCT/JP92/00396 on Mar. 30, 1992.--

Signed and Sealed this

Sixth Day of August, 1996

Attest:

BRUCE LEHMAN

*Attesting Officer*   *Commissioner of Patents and Trademarks*